United States Patent [19]

Fahey et al.

[11] 3,832,488

[45] Aug. 27, 1974

[54] NON-IMPACT PRINTER

[75] Inventors: Wm. David Fahey, Santa Clara; Robert W. Johnson, Los Altos, both of Calif.

[73] Assignee: The Singer Company, Binghampton, N.Y.

[22] Filed: June 29, 1972

[21] Appl. No.: 267,586

[52] U.S. Cl. .................................................. 178/15
[51] Int. Cl. .......................... H04l 15/34, G09f 9/34
[58] Field of Search ................ 178/15, 30; 250/227; 346/107 R

[56] References Cited

UNITED STATES PATENTS

| | | | |
|---|---|---|---|
| 3,274,581 | 9/1966 | Moore et al. | 178/15 |
| 3,359,366 | 12/1967 | Magleby | 178/30 |
| 3,438,057 | 4/1969 | Neitzel | 346/107 R |
| 3,500,470 | 3/1970 | Barker | 178/15 |
| 3,621,138 | 11/1971 | McNaney | 178/15 |
| 3,641,560 | 2/1972 | Klockenbrink | 178/15 |
| 3,644,922 | 2/1972 | James et al. | 178/15 |
| 3,651,258 | 1/1970 | Ammann | 178/15 |
| 3,665,453 | 5/1972 | Nielsen | 178/15 |

*Primary Examiner*—Thomas A. Robinson
*Attorney, Agent, or Firm*—Francis L. Masselle; James C. Kesterson; J. Ronald Richbourg

[57] ABSTRACT

A computer output microfilm printer which employs light-emitting diodes and flexible optic light guides to generate images to be printed on light sensitive film. The light guides have corresponding ends disposed in close proximity to the diodes for receiving light and opposite ends in a linear array which extends transversely of the film. The linear array of light guide ends is imaged on the film by means of a lens. The film is moved continuously in one direction past the optical image of light from the light guide array. By selective energization of the diodes, a complete line of characters is printed in linear segments in a line scan mode, by discrete points of light impinging on the film surface. A film-movement encoder provides mechanical synchronization pulses to control circuitry. Decoding circuitry subdivides characters to be printed into linear segments in response to character binary codes from an input data source. Switching circuitry energizes the diodes in response to the linear segment subdivisions from the decoding circuitry.

8 Claims, 14 Drawing Figures

NON-IMPACT PRINTER

BACKGROUND OF THE INVENTION

1. Field of the Invention

This invention relates generally to a device for recording intelligence, and more particularly to a computer output microfilm (COM) device which employs light emitting diodes and flexible fiber optic light guides.

2. Description of the Prior Art

With new developments in the computer arts tending toward progressively high speed operation, there exists a need for devices that print computer output data at a rate which is substantially faster than prior art mechanical printers. The mechanical printers currently available cannot operate at speeds commensurate with computer processor operation. Therefore, many computer systems employ various techniques for overcoming this disparity in operating speed. One technique employed with the older computers and with many smaller computers is to use a buffer between the processor and the printer. This technique usually requires intermittent stopping and starting of the processor to wait for the printing operation.

Another technique for coping with the speed disparity is to employ several mechanical printers for recording output data from a single high-speed computer. A third technique, commonly employed, is to store output data temporarily on high-speed devices such as a disk-drive or tape-drive unit, and later perform the printing operation independently of the data processing. These techniques constitute an economic waste that may be mitigated substantially by employing COM devices which operate at very high speeds.

Many commercially available COM devices employ a cathod ray tube and a camera system for photographing images formed on the face of the CRT. Computer output data is transformed into signals that drive the deflection coils and control grids of the CRT to form on the CRT screen an image of the output data in a printed format. The CRT can construct a line of print from output data at a very high speed; likewise, the process of photographing images formed on the CRT screen is a high-speed operation. Therefore, these COM devices can substantially alleviate the problem of disparity in speed between computer processing and output data printing. However, COM devices employing this method are expensive.

A recent development in the field has been the use of light emitting diodes (LED) for printing alpha numeric characters on a strip of photosensitive film. A matrix of LED's is provided for each character space in a line and the LED's selectively energized to form the desired character at each position. There are two important disadvantages inherent in a system of this type.

The first is the necessity of stopping the film at each line position while the line of characters is printed. This not only slows the printing process but also introduces electrical and/or mechanical complexities into the system for advancing and positioning the film.

The second disadvantage flows from the large number of LED's required. Each character matrix customarily consists of a 5 × 7 array or 35 diodes. For a typical 132 character line, a total of 4,620 LED's are required as well as circuitry for selectively energizing each matrix in over 30 different combinations for forming only the letters of the alphabet and integers 0 to 9. The result is a complex system which is, therefore, not only high in cost but difficult to service and maintain and statistically susceptible to failures.

The primary general object of this invention is the provision of a novel COM device which overcomes or at least mitigates the shortcomings of comparable prior art devices as discussed above.

A more specific object is the provision of a novel COM device which is capable of higher operating speed than those known heretofore.

Another object is the provision of an improved COM device using light emitting diodes for recording intelligence on a strip of photosensitive film which requires a drastically smaller number of LED's than comparable prior art devices.

A further object is to provide a LED-type COM device as characterized in the next preceding object which does not require intermittent advance of the film strip.

A still further object is the provision of a COM device which, in comparison to those previously known, is simpler in construction, lower in cost, and more reliable in operation.

To the attainment of these and other objects the invention contemplates a COM device in which a linear array of discrete light points from individually controllable sources is imaged transversely of a moving strip of photosensitive film and the light sources are selectively energized in sequential-combinations to form segments of the alphanumeric characters to be recorded on the film, successive segments coacting incrementally as the film moves to form complete characters of an entire line. Means are provided for advancing the film and controlling the energization of the light sources in synchronism.

These and other objects, features and advantages of the present invention will be readily apparent to one skilled in the art to which the invention pertains by reading the following detailed description and claims in conjunction with the accompanying drawings, wherein:

DESCRIPTION OF THE PREFERRED EMBODIMENT

1. Printing Format and Technique

Figure 1:
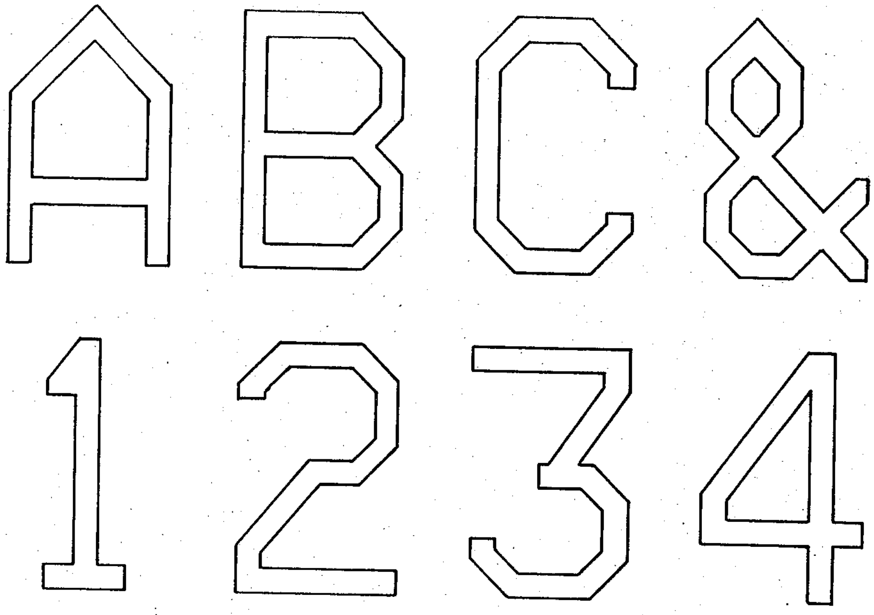
FIG. 1 is an illustration of typical characters which may be printed with a preferred embodiment of the present invention.
Figure 2:
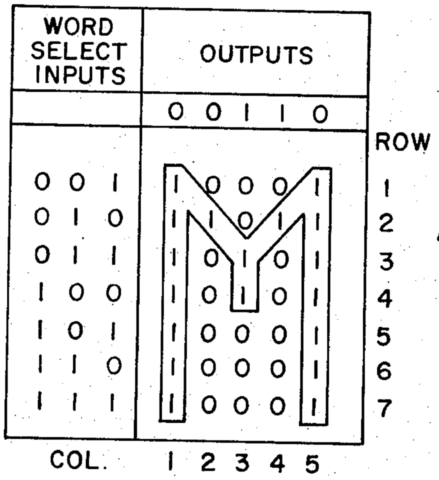
FIG. 2 is a chart showing the method employed for generating a character to be printed by the present invention.

Referring to the drawings and, first, in particular to FIG. 1, shown there are typical characters which can be printed with one form of COM device contemplated by this invention, each character being formed by a combination of dots. A more detailed pattern of the method employed for generating characters from a plurality of dots is illustrated in FIG. 2. Each character format is subdivided into a matrix which consists of seven horizontal rows of five dots per row. At each position of the matrix, a one represents the presence of a dot, and a zero represents the absence of a dot. A single horizontal row or slice of the character is formed at one instant of time, and each of the remaining six rows is formed in sequence thereafter. Therefore, each succeeding row of dots complements the previously printed dots in such a manner as to form the desired character. As will be shown in greater detail hereinbelow, the dots which construct the individual character format comprise a plurality of small points of light which impinge upon photosensitive film.

A typical output printer device has the capability of printing 132 characters on a single line of print, and the exemplary embodiment of the present invention to be described also has this capability. Therefore, since five light sources are required for constructing one character, then 660 (132 × 5) sources of light are required per line of 132 characters. Also, seven successive exposures are required to complete the formation of a single line of print. A space is provided between each group of five light sources to allow for spaces between individual characters within a given line of print.

A provision is made in the circuitry for allowing vertical spacing equivalent to three rows of dots between successive lines of print. Therefore, ten rows are required for the formation of a line of print and the corresponding spacing to the subsequent line of print.

3. Optics

Figure 5:
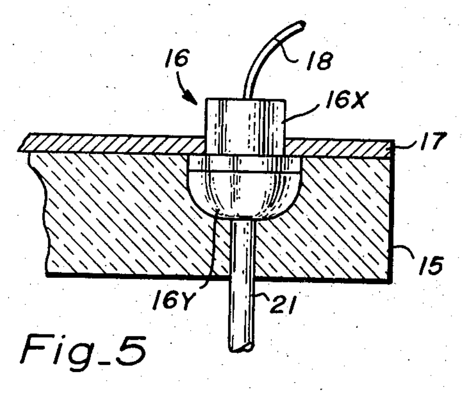
FIG. 5 is a sectional view taken on line 5—5 of FIG. 3 looking in the direction of the arrows.
Figures 3, 4:
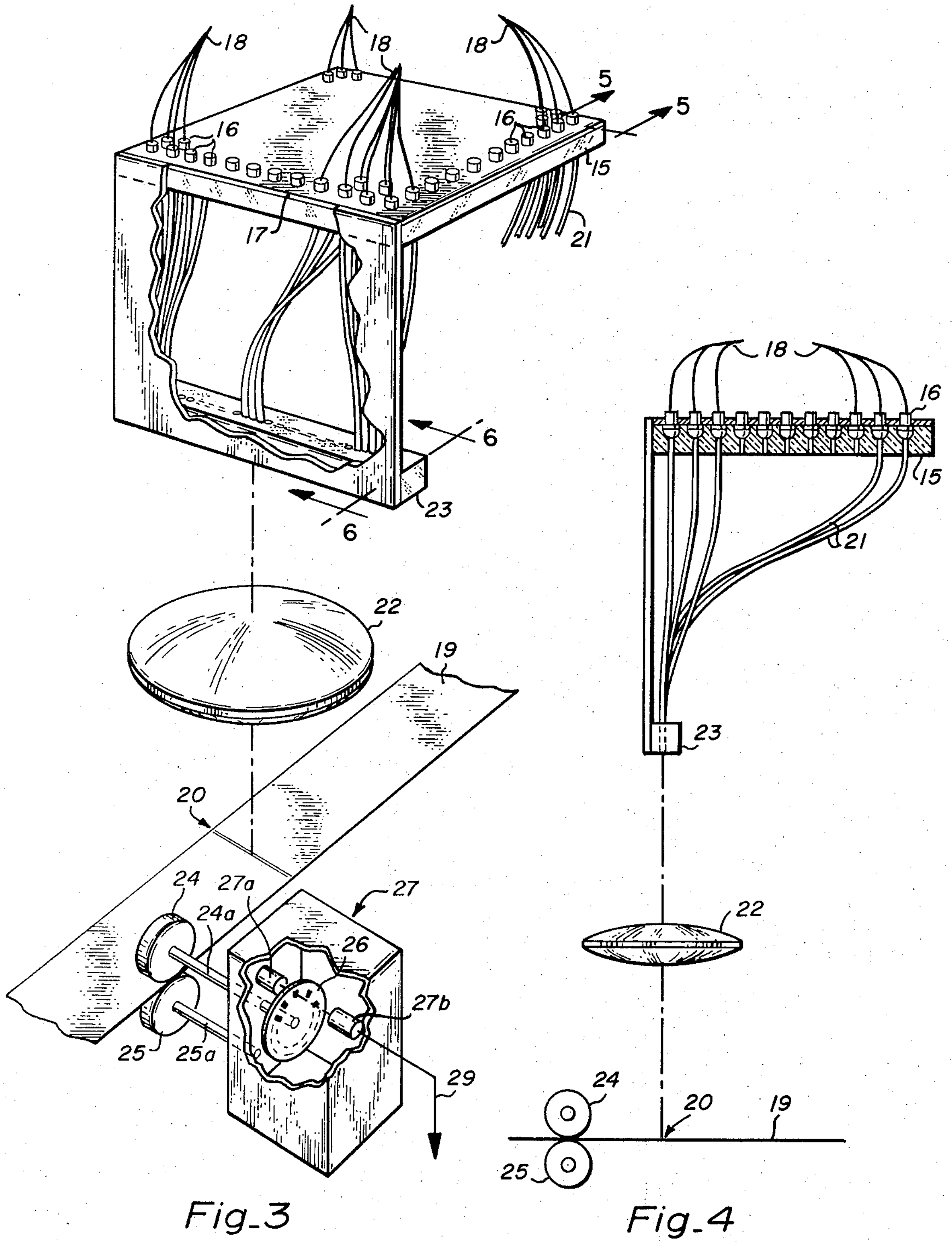
FIG. 3 is a perspective view of the optical components of a COM device in accordance with the present invention.
FIG. 4 is an elevational view, partly in section, of the optical components shown in FIG. 3.

FIGS. 3, 4, and 5 illustrate somewhat schematically the mechanical and optical aspects of the apparatus for generating and printing the character-forming dots. The apparatus comprises a plate 15 in which are mounted a plurality of light emitting diodes 16 arranged in a two-dimensional array. As best seen in FIG. 5, each LED 16 has an anode 16X, a lens 16Y, and a cathode terminal lead 18. An electrically conductive sheet 17 on one surface of plate 15 contacts and interconnects the anodes of all diodes 16. Individual cathod terminal leads 18 are connected to switching circuits described hereinbelow. The diodes may be, for example, model number MF1OA manufactured by Monsanto Electronic Special Products, of St. Louis, Mo. These particular diodes emit light having a wavelength which is typically 6,500 Angstroms.

A strip 19 of photosensitive film is moved lengthwise in one direction by any conventional film transport mechanism (not shown). A film which was found to be compatible with the frequency of light emitted by the diodes is Kodak 2479, manufactured by Eastman Kodak Company of Rochester, N.Y. As the film strip may be moved at a continuous rate, a simple and conventional transport mechanism, not shown, is sufficient for the purposes of this invention.

Light emitted by diodes 16 in the two-dimensional array is directed by means of a plurality of fiber optic light guides 21 to form a linear array which is imaged to define a line of print (or portion thereof) on film 19 at printing station 20 extending transversely of the path of film movement. Thus, one end of each guide 21 abuts the lens 16Y of a respective diode 16. The other end of each of light guide 21 is arranged in a linear array within a support block 23, which extends transversely of the direction of movement of the film. The light guides may be, for example, either glass or plastic fibers manufactured by Fiber Photics, Incorporated, of Santa Cruz, Calif.

Travel of film 19 is monitored by a film position encoder 27 including a pair of opposed pressure rollers 24 and 25 disposed in frictional contact with opposite surfaces of the film. Rollers 24, 25 are fixed to parallel shafts 24*a* and 25*a* respectively, rotatably mounted in and extending into the interior of the housing of encoder 27. Within the housing of encoder 27 is a disk 26 fixed to shaft 24*a*. Thus it will be seen that movement of the film imparts rotary motion to disk 26 by way of roller 24 and shaft 24*a*.

Disk 26 has transparent and opaque sectors arranged arcuately thereon. A light source 27*a* is disposed on one side of disk 26 for directing light toward the surface of the disk. A photocell 27*b* is disposed on the opposite side of disk 26 for receiving light from source 27*a*. A conductor 29 is connected to photocell 27*b*. Rotation of disk 26 causes the transparent and opaque sectors to periodically interrupt light from source 27*a* which in turn causes photocell 27*b* to supply pulses on line 29 indicative of film movement.

The vertical alignment of the components of FIG. 3 described hereinabove is evident from FIG. 4. Lens 22 is located between printing station 20 and support block 23 at a point that will reduce the image of the ends of light guides 21 to a practical size for use with the film. A typical diameter of light guides 21 is 0.002 inches and lens 22 reduces the image diameter to 0.0005 inches at the surface of the film.

It is a well-known characteristic of flexible fiber optic light guides that light may be reflected therethrough even though the fibers may be curved. However, the intensity of the light emitted by the light guide may vary depending on the amount of bending placed on the guide and the angle at which light is directed into the light guide. The light guides may be spaced a small distance from the lens to change the angle of light directed into the light guides. Also, the diodes may be twisted in their mountings to change the orientation of the light received by the light guides. Once the intensity of the light is adjusted in this manner, no additional adjustments are required. The intensity of the light emitted by the diode may be varied in the switching circuit components to be described hereinbelow.

Figure 6:
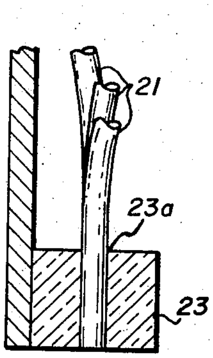
FIG. 6 is a sectional view taken on line 6—6 of FIG. 3 looking in the direction of the arrows.

FIG. 6 is a cross-sectional view of support block 23 and shows the light guides mounted therein. An opening such as 23*a* is provided in block 23 for receiving each of light guides 21. The primary function of block 23 is to arrange the ends of the light guides in a linear array and in a position which directs light in a direction which is perpendicular to the film surface.

In operation, selected ones of diodes 16 are energized via their respective conductors 18 and light generated passes through the respective diode lens 16Y. This light is conducted through the corresponding light guides 21 and reflected from the end of the light guides mounted within support block 23. Lens 22 forms a reduced image of the linear array of light guide ends onto film 19 which is thus exposed to make a latent photographic image of each light guide end which appear as dots when the film is developed.

Reverting to FIG. 2, row 1 is first aligned at print station 20 for exposure, and diodes 16 corresponding to columns 1 and 5 are energized. When row 2 is aligned at print station 20 for exposure, the diodes corresponding to columns 1, 2, 4 and 5 are energized. The film continues to pass through print station 20 for the subsequent rows, and additional exposures are made on the film until the full complement of dots for the character has been exposed. While described with respect to a single character, it will be understood that an entire line, e.g., 132 characters may be printed at the same time. Therefore, the first row of all 132 characters may be exposed simultaneously (or in a ripple fashion), then row 2 for all 132 characters may likewise be exposed, etc.; until seven rows of all 132 characters are exposed.

4. Circuits

Figure 7:
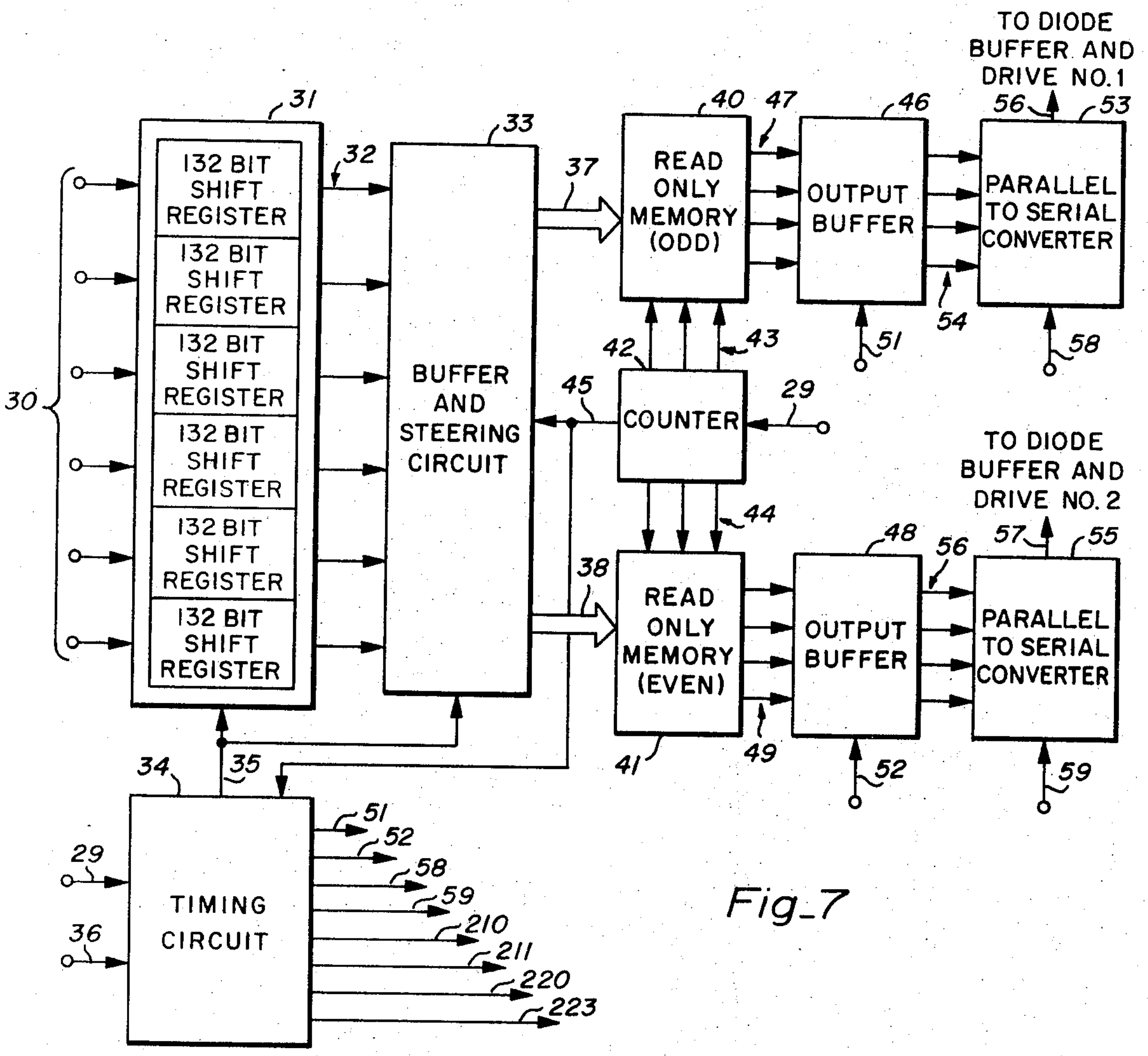
FIG. 7 is a block diagram of the circuits employed for decoding input data for printing in accordance with one embodiment of the present invention.

Referring now to FIG. 7, six-bit binary data is supplied on lines 30 from a data source such as a digital computer (not shown); each combination of 6 bits corresponds to a binary code for a character to be printed. These lines supply input data to six shift registers 31 which are capable of storing 132 bits each. The shift registers may be constructed in a manner as shown on page 346 of the book entitled: "Pulse, Digital, and Switching Waveforms," by J. Millman and H. Taub.

The binary codes, representative of characters to be printed, are supplied from registers 31 via lines 32 to a buffer and steering circuit 33. A timing circuit 34 provides timing signals to registers 31 and circuit 33 via line 35 for synchronization of operation. It is pointed out at this juncture that a provision is made within registers 31 to re-cycle the data stored therein seven times for the seven horizontal rows of the characters to be printed. Conventional gating techniques are employed which are responsive to timing signals from circuit 34. The timing circuit is synchronized by the driving equipment, such as the data source, by signals supplied on line 36. Also, pulses on line 29 are supplied to the timing circuit to synchronize the film movement to the circuits. The signals from timing circuit 34 to registers 31 control the loading of the registers. Timing diagrams will be discussed hereinbelow which will illustrate the relationship of the numerous signals provided by circuit 34. Timing circuits are well-known to those conversant with the art.

A provision is made for cutting operation time in half by decoding all odd-numbered characters in one portion of the circuit, and decoding all even-numbered characters in an identical second portion of the circuit. The term "odd-numbered characters" as used herein denotes characters in positions 1, 3, 5, 7, etc., of the line of 132 characters to be printed. Likewise "even-numbered characters" denotes characters in positions 2, 4, 6, 8, etc., of the line of 132 characters to be printed. Timing signals on line 35 to circuit 33 control the steering of odd-numbered characters on lines 37 and even-numbered characters on lines 38. Lines 37 are connected as an address input to a read only memory (ROM) 40 and lines 38 are likewise supplied as an address input to a ROM 41. Read only memories 40 and 41 may be, for example, Model No. EA3501 manufactured by Electronic Arrays, Inc., of Mountain View, Calif. A typical application for the EA3501 is the generation of characters by subdividing each character into seven horizontal rows. An address representative of the character is supplied as one set of inputs, and row-count signals from a counter are supplied as a second set of inputs. Therefore, seven sets of binary numbers, which correspond to the rows, are supplied sequentially from the ROM in response to a single character address input and a series of row-count signals from the counter.

This particular type of ROM operates with ASCII binary codes as an address input; therefore, input data on lines 30 should conform to this code. However, other types of ROM's may be used which operate with other types of binary codes.

Counter 42 is incremented by pulses on line 29 from encoder 27. Counter 42 supplies a count of one through seven to ROM 40 via lines 43, and also supplies the same count sequence to ROM 41 via lines 44. Also, a signal is supplied from counter 42 to circuits 33 and 34 on line 45, which is indicative of a count of 8, 9 and 10. This signal is employed within circuits 33 and 34 to allow for the vertical spacing between individual lines of print.

The binary numbers for individual rows of a particular character are supplied to output buffer 46 from ROM 40 via lines 47, and to buffer 48 from ROM 41 via lines 49. A timing signal is supplied to buffer 46 via lines 51, and to buffer 48 via line 52. These timing signals control the loading of these buffers with the binary numbers from the ROM's. It is pointed out at this juncture that data (binary numbers) on lines 47 and 49 are indicative of a single horizontal slice of an individual character to be printed, whereas data on lines 37 and 38 is the ASCII binary code indicative of the complete individual character itself. Data is supplied to parallel-to-serial converter 53 from buffer 46 via lines 54. Likewise, data is supplied to parallel-to-serial converter 55 from buffer 48 via lines 56. Serialized data is supplied from converter 53 on line 56 and from converter 55 on line 57. A timing signal is supplied to converter 53 on line 58 and to converter 55 on line 59 for transferring the data received from the buffers in serialized form on lines 56 and 57, respectively.

Figure 8:
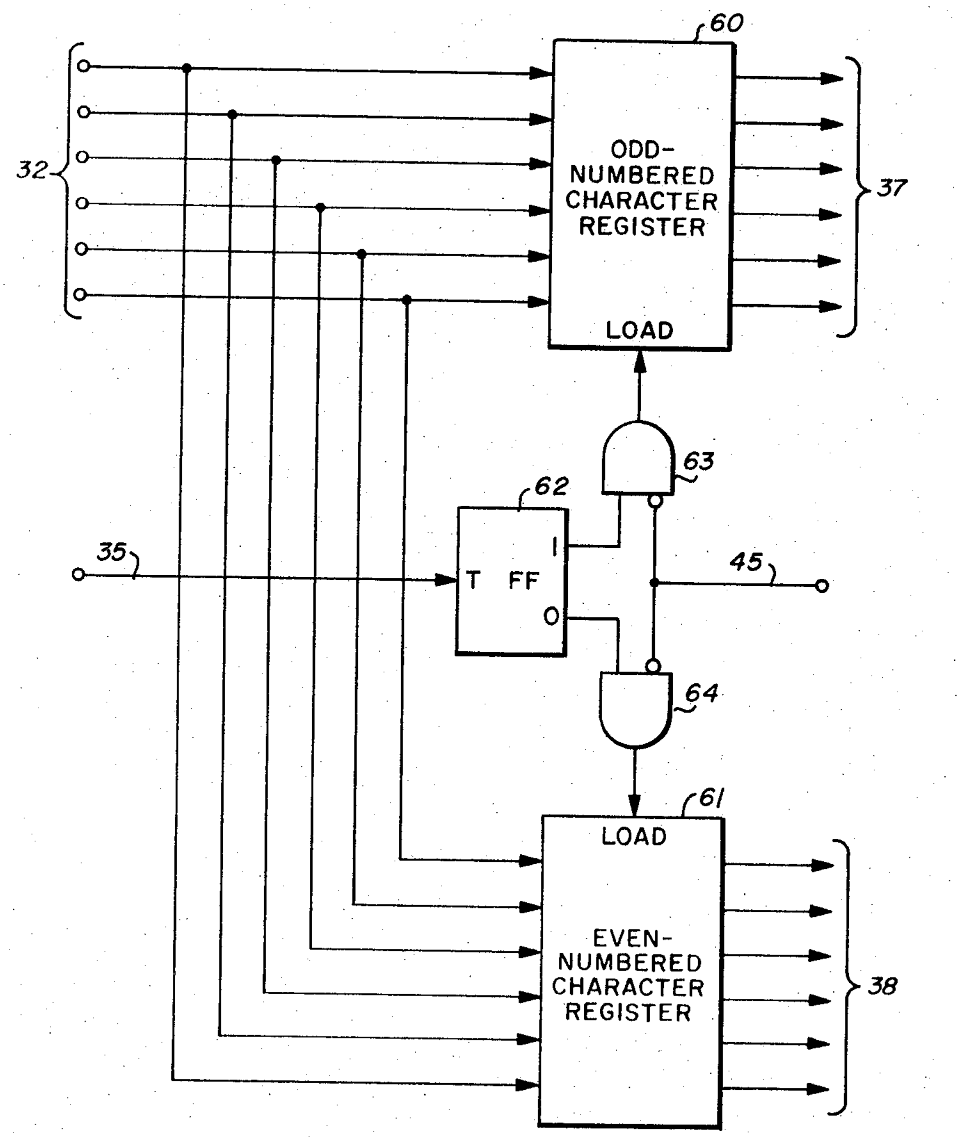
FIG. 8 is a block diagram of a buffer and steering circuit constituting a portion of the block diagram of FIG. 7.

FIG. 8 illustrates buffer and steering circuit 33 in more detail. The six data lines 32 from shift registers 31 are connected, in parallel, to odd register 60 and even register 61. Line 35 is connected to the toggle input of a flip-flop 62. The "one" output of flip-flop 62 is connected to one of two inputs of AND gate 63. The second input of AND gate 63, which is an inverting input, is connected to line 45. The "zero" output of flip-flop 62 is connected to one of two inputs of AND gate 64. The second input of AND gate 64, which is also an inverting input, is connected to line 45. The output of AND gate 63 is connected to a "load" input of register 60, and the output of AND gate 64 is connected to the "load" input of register 61. The output of register 60 is connected to lines 37, and the output of register 61 is connected to lines 38.

In operation, the binary code for the first character to be printed is applied to the inputs of registers 60 and 61. A pulse is supplied on line 35 which sets flip-flop 62, and the "one" output thereof supplies a high-level signal to AND gate 63. Assume that counter 42 is at a count of one. Therefore, the signal on line 45 is at a low level. Since the second input to AND gate 63 is an inverting input, a high-level signal appears at the "load" input of register 60. The binary code on lines 32 is now entered into register 60 and appears at the output thereof on lines 37. The binary code applied to register 61 had no effect since AND gate 64 was not enabled. The next pulse supplied on line 35, which indicates the presence on lines 32 of the binary code for the second character to be printed, changes the state of flip-flop 62. Therefore, AND gate 64 is enabled and the second binary code is loaded into register 61. This process continues through row one for all 132 characters, then counter 42 increments to a count of two and the same 132 binary codes are applied to registers 60 and 61 in the same fashion. When the binary code for the 132 characters has been applied on lines 32 seven times (seven horizontal rows of the characters to be printed), a count of 8, 9 and 10 from counter 42 inhibits the loading of data into registers 60 and 61 via the inverting inputs to AND gates 63 and 64. More particularly, when counter 42 is at a count of eight, nine or 10, a high-level signal appears on line 45 which disables AND gates 63 and 64. As was discussed hereinabove, the count of eight, nine and 10 allows for the vertical spacing between individual lines of print. Also, during the time allowed for vertical spacing, new data is loaded into registers 31 from the data source.

Referring again to FIG. 7, the first binary code is supplied to ROM 40 on lines 37. Assume once again that counter 42 is at a count of one. Therefore, ROM 40 is addressed to decode a binary number representative of the first horizontal row of the first character. This binary number is transferred to output buffer 46 via lines 47 when a "load" pulse is supplied on line 51. Once the binary number is loaded in buffer 46, it is then applied to converter 53 via lines 54. A series of pulses are supplied on line 58 which transfer the binary number, serially, on line 56 to the print circuitry. In a similar manner, the binary number for the second row is decoded from ROM 41 and is transferred to buffer 48 and converter 55.

Figure 9:
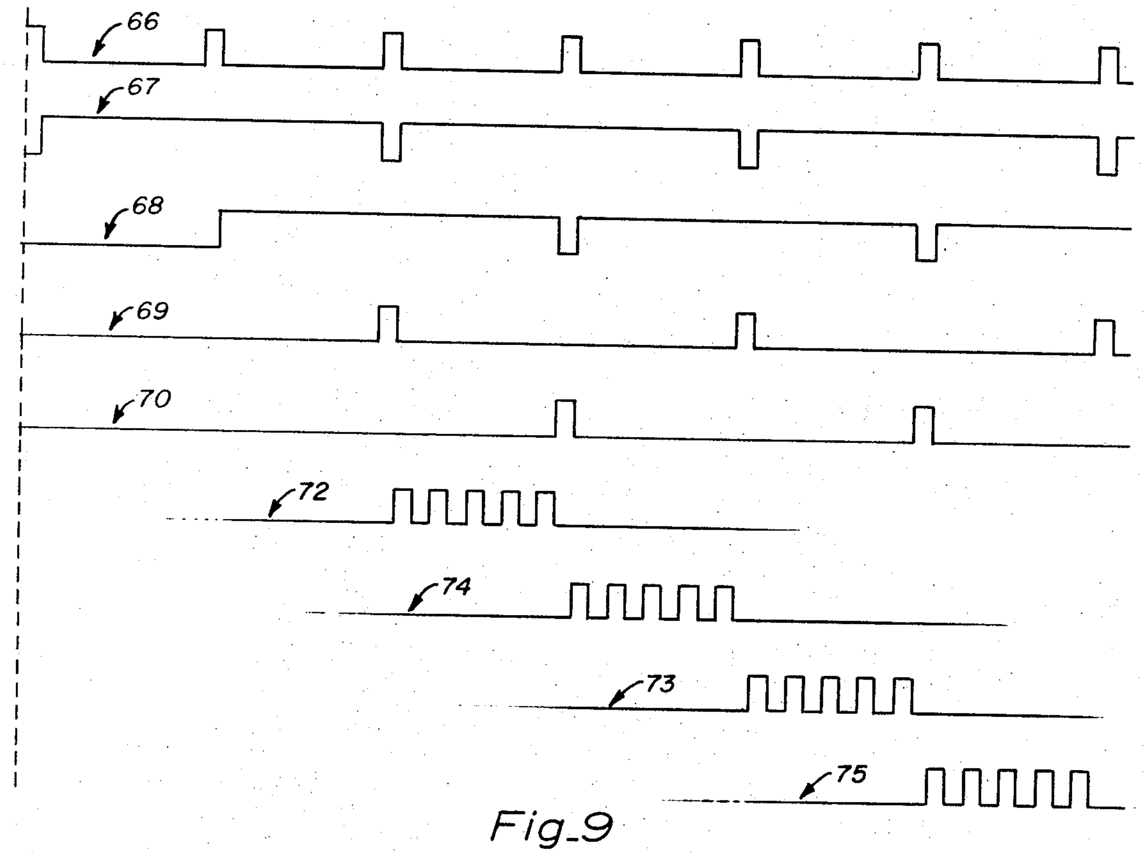
FIG. 9 is a timing diagram of the operation of decoding data to be printed.

The operation of the circuits shown in FIGS. 7 and 8 will be more fully understood from a description of the timing diagram shown in FIG. 9. Waveform 66 represents the transfer of a series of characters from shift registers 31 to circuit 33, wherein each positive pulse is indicative of the time required for transferring a single character binary code. Waveform 67 represents the decoding operation of odd-numbered characters into horizontal rows by ROM 40, and waveform 68 represents the decoding operation of even-numbered characters by ROM 41. Waveform 69 represents the timing signal supplied on line 51 for loading data from ROM 40 into buffer 46; and waveform 70 represents the timing signal supplied on line 52 for loading data from ROM 41 into buffer 48. Waveforms 72 and 73 represent the pulses supplied on line 58 for transferring data serially from converter 53, and waveforms 74 and 75 represent the pulses supplied on line 59 for transferring data (again serially) from converter 55. This decoding operation of row one continues through the first row of all 132 characters.

Figure 10:
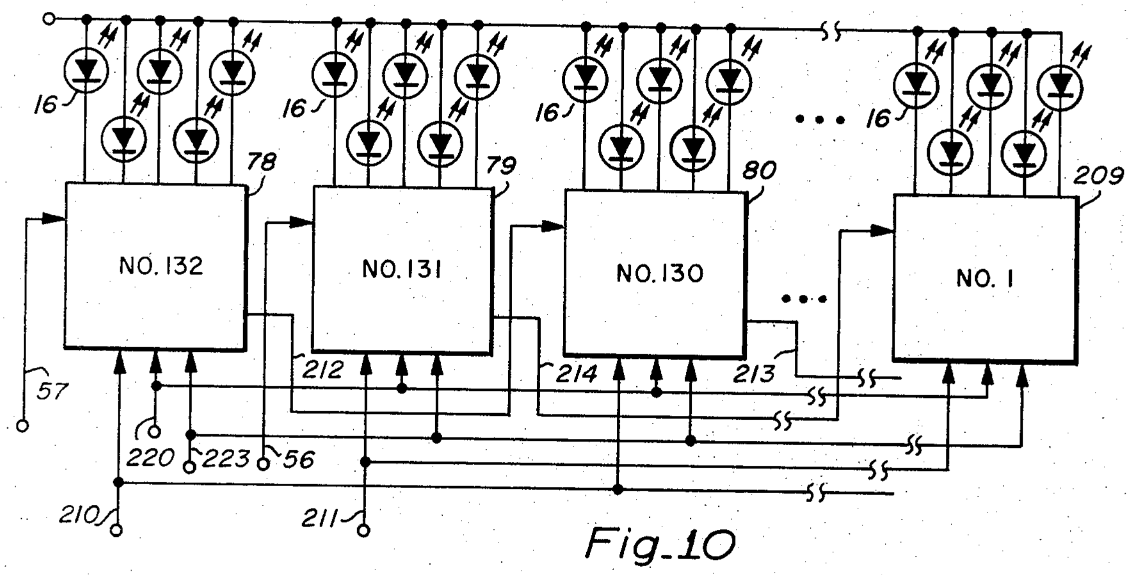
FIG. 10 is a block diagram of a typical example of the circuits for storing decoded data and energizing the light emitting diodes.

As shown in FIG. 10, four of 132 storing and diode switching circuits 78–209 are illustrated with electrical connections therebetween. Circuit 78 controls the switching of the five diodes associated with character position number 132, and circuit 209 controls the switching of the five diodes associated with character position number one. The serialized form of the binary numbers from converter 53 (odd-numbered characters) is supplied to circuit 79 via line 56, and the serialized form of the binary numbers from converter 55 (even-numbered characters) is supplied to circuit 78 via line 57. Each of circuits 78–209 contains a shift register constructed in the same fashion as that described hereinabove for registers 31. A shift pulse is supplied to all the circuits for even-numbered characters on line 210, and to all the circuits for odd-numbered characters on line 211. These shift pulses are produced within timing circuit 34 of FIG. 7.

The shift registers contained within the circuits for the odd-numbered characters are connected in one series chain, and the registers contained within the circuits for the even-numbered characters are connected in a second series chain, i.e., the output of the register in circuit 78 is connected to the input of the register in circuit 80 via line 212, and the output of the register in circuit 80 is connected to register in the next circuit (not shown) via line 213. Likewise, the output of the register in circuit 79 is connected to the input of the register in the next circuit (not shown) via line 214.

Figure 11:
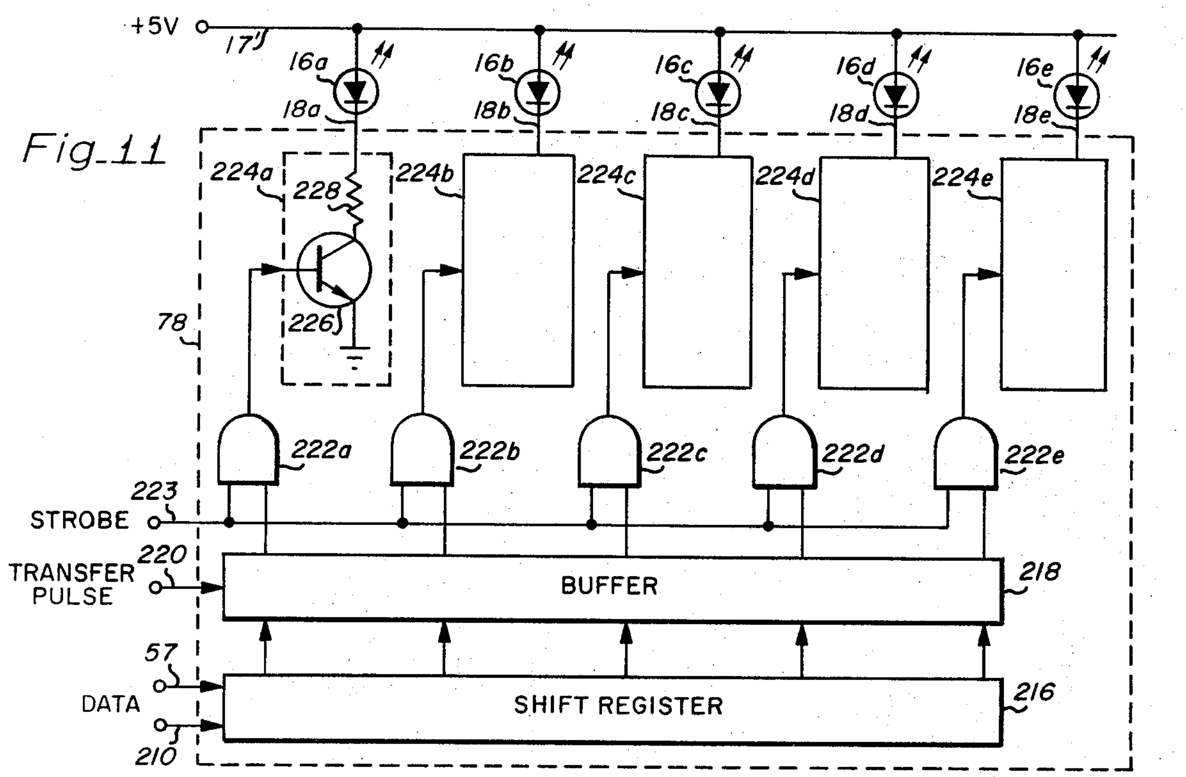
FIG. 11 is a detailed block diagram of an individual circuit for storing data and energizing the diodes.

The operation of the circuits in FIG. 10 will be more readily understood following a detailed description of the structure of a typical storing and switching circuit. FIG. 11 is a block diagram of storing and switching circuit 78. Line 57, which supplies serialized data from converter 55, is connected as an input to shift register 216. Shift pulses are supplied to the shift register on line 210 as stated hereinabove. Register 216 has the capability of storing the five-bit binary number which corresponds to the 5 bits for an individual row of a given character to be printed. The binary number stored in register 216 is supplied, in parallel, to buffer 218; and this number is transferred to the buffer upon the application of a transfer pulse on line 220 from timing circuit 34. The binary number which is now stored in buffer 218 is supplied to one of two inputs of AND gates *222a* through *222e*, the second inputs of which are connected to a line 223 supplying a print strobe signal from timing circuit 34. Respective switching circuits *224a–224e* are provided between the outputs of gates *222a–222e* and LED's *16a–16e*. As previously described, the anodes of LED's *16a–16e* are interconnected by a metal sheet 17 (FIGS 3–4), represented in FIG. 11 by conductor 17', to which is applied a positive potential of low magnitude, e.g., 5V.

As switching circuits *224a–224e* are duplicative, only one, *224a*, is shown and will be described. Thus, *224a* consists of an NPN transistor 226, the base terminal of which serves as the input and is connected to the output of gate 222*a*. The emitter of transistor 226 is grounded and the collector is connected through a series resistor 228 to the cathode terminal 18*a* of LED 16*a*. Switching circuits 224*b*–224*e* are similarly connected between the outputs of gates 222*b*–224*e* at the cathode terminals 18*b*–18*e* of LED's 16*b*–16*e*.

Referring again to FIG. 10, lines 220 and 223 are connected to each of circuits 78–209, respectively. The binary numbers representative of the first row of the even-numbered characters are supplied serially, with the lowest position number first, to circuit 78 via line 57. Pulses on line 210 shift the binary numbers through a register (not shown), which is similar to register 216, within each of the circuits 78, 80, 82, etc. At the same time, the binary numbers representative of the first row of the odd-numbered characters are supplied serially, again with the lowest position number first, to circuit 79 via line 56. Pulses on line 211 shift the binary numbers through registers (not shown) within circuits 79, 81, etc.

When the serialized form of the binary numbers representative of the first row of 132 characters for a given line of print are loaded into the shift registers within circuits 78–209, a transfer pulse is supplied on line 220. This transfers the binary numbers to the corresponding buffers whereupon a print strobe signal is supplied on line 223 which enables the AND gates. A typical AND gate 222*a* provides a high-level signal to a typical NPN transistor 226 which renders the transistor conductive enabling current flow from the 5V source, through conductor 17', diode 16*a*, resistor 228, to ground causing light to be emitted from diode 16*a*. The brightness of the light emitted from the LED is determined by the value of regulating resistor 228. The remaining LED switching circuits operate in a similar fashion.

Figure 12:
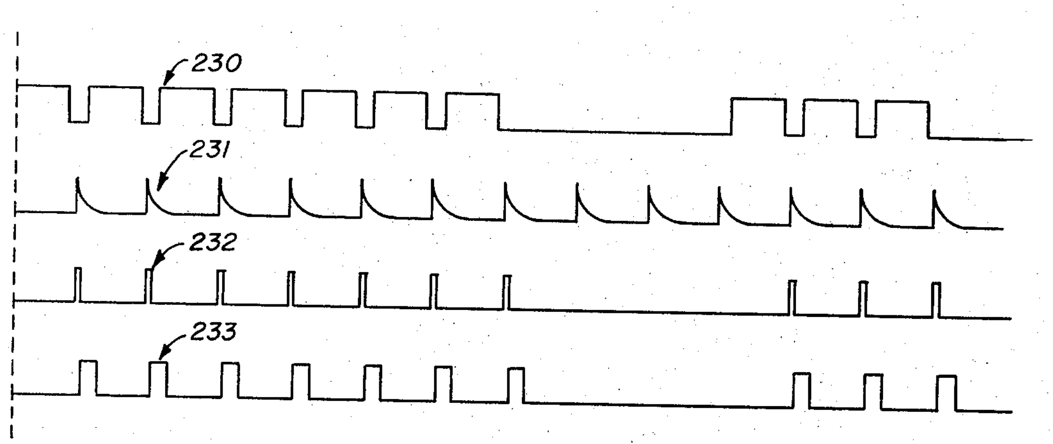
FIG. 12 is a timing diagram of the printing operation.

The timing diagram shown in FIG. 12 illustrates a complete cycle of circut operation for printing a line of characters and allowing for vertical spacing to the subsequent line. Waveform 230 represents the decoding operation for a single line of print and the corresponding vertical spacing thereafter. Each of the positive pulses represents a single decoding operation for an individual row of a given line of characters to be printed. Waveform 231 represents the pulses supplied from encoder 27 on line 29. Each positive pulse represents a single row. Waveform 232 represents the transfer pulse supplied on line 220. Waveform 233 represents the print strobe supplied on line 223.

Referring again to FIG. 2, the binary number 001101 is the ASCII code for the letter M. As described hereinabove, each character to be printed is subdivided into seven rows of 5 bits per row. The binary numbers in the column designated (word select inputs) represent the row-count signals supplied to ROM 41 via lines 44 from counter 42. Assume, for example, that binary number 001101 was character number 132, an even-numbered character, to be printed on a given line of print. This binary number is applied as an address input to ROM 41 via lines 38. Counter 42 applies a count of one (001) to ROM 41 via lines 44. The output binary number from ROM 41 is 10001, and is transferred subsequently to buffer 48 and converter 55. The converter transfers this binary number serially to storing and switching circuit 78 via line 57. This binary number is shifted into register 216 and stored therein until a transfer pulse (waveform 232) is applied on line 220 whereupon the number is transferred to buffer 218. The number is applied as inputs to one side of AND gates 222*a* through 222*e*. When a print strobe signal (waveform 233) is applied on line 223, AND gates 222*a* and 222e apply a high-level signal to switching circuits 224*a* and 224*e*, respectively. This causes current to pass through diodes 16*a* and 16*e* and light is emitted from these two diodes. Since a low level signal is applied to the inputs of AND gates 222*b*, 222*c* and 222*d*, diodes 16*b*, 16*c* and 16*d* are not effected.

As mentioned hereinabove, a provision is made within registers 31 for recycling the binary codes for the 132 characters back into the individual registers. Therefore, upon completion of row one decoding for all 132 characters, the operation of decoding row two for the same 132 characters commences. When the film has moved to a position corresponding to the second row of the characters to be printed, a signal is supplied on line 29 (waveform 231) from encoder 27 to step counter 42 to a count of two. When the code 001101 for the letter M in character position 132 is applied as an address input to ROM 41 for a second time, and counter 42 is at a count of two (010), then the binary number 11011 is supplied to buffer 48 from ROM 41. This binary number is transferred serially from converter 55 to shift register 216. When a transfer pulse (waveform 232) is again supplied on line 220, the binary number is transferred to buffer 218. In a similar manner, diodes 16*a*, 16*b*, 16*d* and 16*e* are switched on by the application of high-level signals from AND gates 222*a*, 222*b*, 222*d* and 222*e* to circuits 224*a*, 224*b*, 224*d* and 224*e*, respectively. This process continues until all seven rows of the characters to be printed are complete.

A SECOND EMBODIMENT OF THE PRESENT INVENTION

Figure 13:
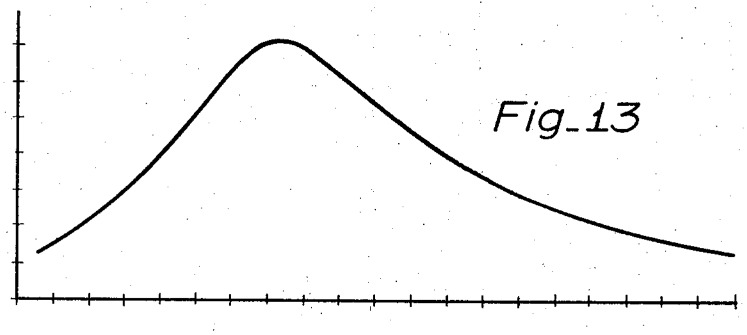
FIG. 13 is an illustration of a graph which may be printed with an alternate embodiment of the present invention.

It is also possible with the concept of this invention, to construct a linear array of adjacent light sources within support block 23 for printing graphical output data, such as that shown in FIG. 13. By employing the same technique as disclosed herein, the graph is subdivided into individual horizontal rows; and a combination of dots are exposed on the film for each row in sequence. Any image which may be represented by the well-known CRT raster-scan display technique can also be printed by a device in accordance with the present invention. Each raster is supplied sequentially as an input, wherein the raster corresponds to a row and individual elements of the raster correspond to the dots.

Figure 14:
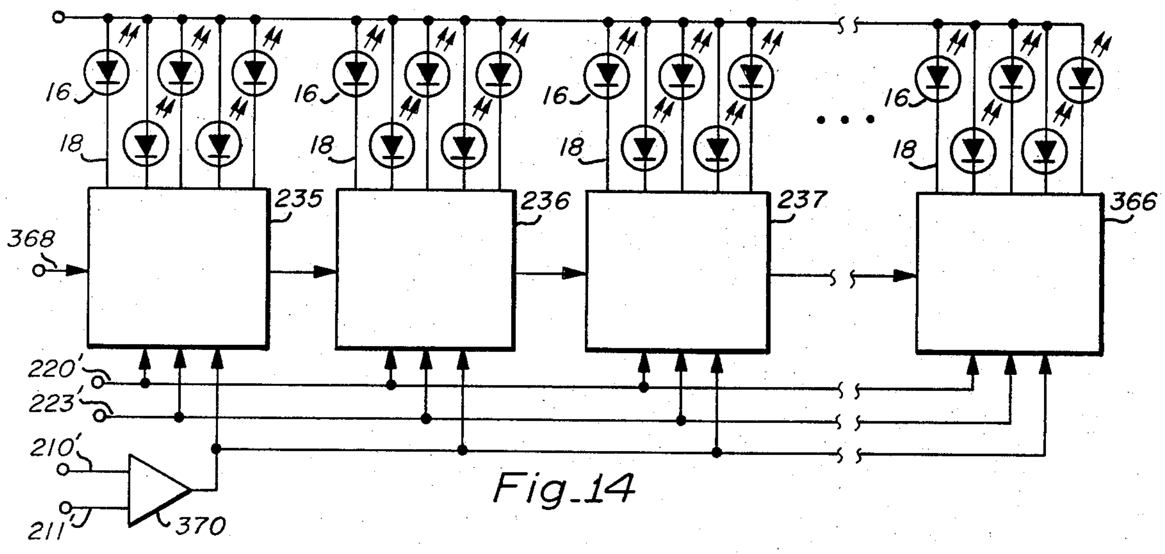
FIG. 14 is a block diagram of a plurality of circuits for storing data and energizing the light emitting diodes which is constructed in accordance with the alternate embodiment of the present invention.

As shown in FIG. 14, a group of storing and switching circuits 235–366, which are constructed in the same manner as that shown in FIG. 10, are connected in a single series chain. Serialized binary data, which represents a single raster of the graph or drawing to be printed, is supplied from a data source to circuits 235–366 on line 368. Lines 210' and 211' are connected to the two inputs of an OR gate 370. The output of the OR gate is connected to the shift input of each of the shift registers contained within circuits 235–366. Transfer pulses are supplied on line 220', and print strobes are supplied on line 223'.

The operation is essentially the same as described hereinabove for the circuit shown in FIG. 10. The primary difference is that serialized data is supplied to the storing and switching circuits directly from the data source.

For example, if a drawing or graph were represented by the conventional CRT technique, then a single raster of the CRT image is loaded into all of the diode buffer and driver units. The switching of diodes 16 is effected in the same manner as described hereinabove.

If several diodes are energized at a given time, then a large current drain would be demanded from the power supply. Therefore, an alternate technique of supplying separate print strobes individually to circuits 235–366 may be employed which would mitigate this problem. One such circuit modification may be, for example, the insertion of a time delay network between line 223 from circuit 34 and the shift pulse inputs to the registers within circuits 235–366. The time delay network contemplated herein is responsive to a single pulse input, and has a provision for a plurality of individual outputs wherein each output provides a pulse which is delayed in time from the pulse on a second output. Therefore, each of circuits 235–366 responds independently to individual print strobes or in a ripple fashion which was alluded to hereinabove. A delay network such as this is well-known in the art and may be constructed from a counter and decoders or simply a time delay line.

While the invention has been described with respect to a preferred and second embodiment, it will be apparent to those skilled in the art that various improvements and modifications may be made without departing from the scope and spirit of the invention. Accordingly, it is to be understood that the invention is not to be limited by the specific illustrative embodiments, but only by the scope of the appended claims.

What is claimed is:

1. Apparatus to record information, a line at a time, on a photosensitive medium by selectively exposing spaced areas which are transversely aligned with respect to the axis of advance of that medium, as such medium is advanced, to form successive and substantially parallel rows of said selectively exposed areas, which rows, when viewed together, combine to produce said information, comprising:

a plurality of fiber optic light guides, a first end of each of said light guides arranged such that said first ends form a row;

a plurality of light sources, equal in number to the number of light guides, and one of said plurality of light sources adjacent the second end of each of said light guides such that light from each of said light sources is transmitted through the light guide with which it is adjacent, and such that said transmitted light is projected from said first end of that light guide which is in a row with the first ends of the other light guides;

said photosensitive recording medium positioned to intercept light projected from said first ends of said row of light guides for recording said projected light;

control means responsive to data inputs for selectively energizing said light sources such that light is projected from selected ones of said row of first ends; and driving means synchronized with said control means for moving said medium in a direction substantially perpendicular to said row of light guide ends such that a plurality of rows of said selected exposed areas are at spaced intervals with each other and when viewed together display data in a desired format.

2. Apparatus as defined in claim 1 wherein said recording medium is film.

3. Apparatus as defined in claim 1 wherein said light sources are light emitting diodes.

4. Apparatus as defined in claim 1 wherein said light directing means further comprises a lens disposed between said light guides and the recording medium projecting a reduced image of the row image onto said recording medium.

5. Apparatus as defined in claim 4 which includes an encoder physically coupled to said recording medium for producing pulses indicative of increments of recording medium movement to synchronize said energizing means with said moving means.

6. The invention according to claim 5 wherein said line of information comprises M alphanumeric characters each formed from a matrix of $x$ rows and $y$ columns of dots, said plurality of light sources is equal to M times $y$, said light directing means images said light sources in groups of $y$ and said means to energize is operated $x$ successive times to thereby print a line of alphanumeric characters.

7. The invention according to claim 6 wherein said M alphanumeric characters are provided as coded binary inputs and further including means to decode said inputs into $x$ successive sets of said data inputs defining the dots to be recorded on said $x$ successive rows.

8. Apparatus to record information, a line at a time, on a photosensitive medium by selectively exposing spaced areas which are transversely aligned with respect to the axis of advance of that medium, as such medium is advanced to form successive and substantially parallel rows of said selectively exposed areas, which rows, when viewed together, combine to produce said information, comprising:

a plurality of fiber optic light guides, a first end of each of said light guides arranged such that said first ends form a row;

a plurality of light sources, equal in number to the number of light guides, and one of said plurality of light sources adjacent the second end of each of said light guides such that light from each of said light sources is transmitted through the light guide with which it is adjacent, and such that said transmitted light is projected from said first end of that light guide which is in a row with the first ends of the other light guides;

said photosensitive recording medium positioned to intercept light projected from said first ends of said row of light guides for recording said projected light;

a lens disposed between said row of first ends and the recording medium for reducing the image of said light projected from said first ends;

control means responsive to data inputs for selectively energizing said light sources such that light is projected from selected ones of said row of first ends;

an encoder physically coupled to said recording medium for producing pulses indicative of medium movement; and driving means responsive to said encoder pulses and synchronized with said control means for moving said medium in a direction substantially perpendicular to said row of light guide ends such that a plurality of rows of said selected exposed areas are at spaced intervals with each other and when viewed together display data in a desired format.

* * * * *